(12) United States Patent
Pihl (10) Patent No.: US 11,560,782 B2
(45) Date of Patent: Jan. 24, 2023

(54) TECHNIQUES TO IMPROVE WIRELESS COMMUNICATIONS FOR IN-SITU WELLBORE DEVICES

(71) Applicant: HALLIBURTON ENERGY SERVICES, INC., Houston, TX (US)

(72) Inventor: Joachim Alexander Pihl, Sandefjord (NO)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 136 days.

(21) Appl. No.: 17/058,504

(22) PCT Filed: Jul. 19, 2018

(86) PCT No.: PCT/US2018/042951
§ 371 (c)(1),
(2) Date: Nov. 24, 2020

(87) PCT Pub. No.: WO2020/018107
PCT Pub. Date: Jan. 23, 2020

(65) Prior Publication Data
US 2021/0198999 A1    Jul. 1, 2021

(51) Int. Cl.
*E21B 47/008* (2012.01)
*E21B 47/13* (2012.01)
(Continued)

(52) U.S. Cl.
CPC ............ *E21B 47/008* (2020.05); *E21B 47/13* (2020.05); *H04L 67/12* (2013.01); *H04W 4/38* (2018.02)

(58) Field of Classification Search
CPC ........ E21B 47/008; E21B 47/13; H04W 4/38; H04L 67/12
See application file for complete search history.

(56) References Cited

U.S. PATENT DOCUMENTS

| 4,445,694 A | 5/1984 | Flaherty |
| 4,773,680 A | 9/1988 | Krumme |

(Continued)

FOREIGN PATENT DOCUMENTS

WO    9104433 A1    4/1991

OTHER PUBLICATIONS

Duerig, Melton, "Applications of Shape of Memory in the USA", New Materials and Processes for the Future; pp. 195-200; 1989; retrieved from www.nitinol.com on Jul. 18, 2018.

(Continued)

*Primary Examiner* — Manuel L Barbee
(74) *Attorney, Agent, or Firm* — Novak Druce Carroll LLP (57) ABSTRACT

A system for monitoring conditions in a wellbore includes a sensor assembly and a controller assembly. The sensor assembly attaches to a portion of a casing disposed in the wellbore and includes a sensor module and an inductive module. The sensor module measures conditions in the wellbore and the inductive module forms a wireless communication channel. The inductive module includes a first set of inductive coils and a second set of inductive coils that substantially surround the first set of inductive coils. The controller assembly attaches to a portion of a production tube housed within the casing and includes at least one coil inductively coupled to the inductive module, and communicates signals over the wireless communication channel.

17 Claims, 9 Drawing Sheets

(51) Int. Cl.
*H04L 67/12* (2022.01)
*H04W 4/38* (2018.01)

(56) References Cited

U.S. PATENT DOCUMENTS

| | | |
|---|---|---|
| 4,781,605 A | 11/1988 | Herubel et al. |
| 5,058,936 A | 10/1991 | Kapgan et al. |
| 5,226,683 A | 7/1993 | Julien et al. |
| 5,662,362 A | 9/1997 | Kapgan et al. |
| 6,053,992 A | 4/2000 | Wu et al. |
| 6,435,519 B1 | 8/2002 | White |
| 7,699,556 B2 | 4/2010 | Efremov |
| 8,100,410 B2 | 1/2012 | Alacqua et al. |
| 8,535,012 B2 | 9/2013 | Schlosser et al. |
| 8,602,419 B2 | 12/2013 | Namuduri et al. |
| 2002/0074742 A1 | 6/2002 | Quoiani |
| 2006/0005965 A1 | 1/2006 | Chouzenoux et al. |
| 2007/0241516 A1 | 10/2007 | Efremov |
| 2008/0042368 A1 | 2/2008 | Tewari |
| 2008/0136180 A1 | 6/2008 | Dittmar |
| 2009/0206552 A1 | 8/2009 | Nguy et al. |
| 2011/0163890 A1* | 7/2011 | Bowles .............. E21B 47/12 340/854.8 |
| 2012/0161535 A1* | 6/2012 | Jung .............. H02J 7/025 307/104 |
| 2015/0167452 A1 | 6/2015 | Godager et al. |
| 2017/0178804 A1 | 6/2017 | Leem |
| 2019/0234177 A1* | 8/2019 | Silva .............. E21B 17/042 |

OTHER PUBLICATIONS

Wu, Ming H. et al., "Industrial Applications for Shape Memory Alloys", Proceedings of the International Conference on Shape Memory and Superelastic Technologies, Pacific Grove, California; p. 171-182; 2000.

Patil, Devendra et al., "A review of shape memory material's applications in the offshore oil and gas industry", Topical Review; Smart Materials and Structures; p. 1-17; 2017.

International Search Report, Response & Written Opinion, PCT Application No. PCT/US2018/042951, dated Feb. 28, 2019.

* cited by examiner

TECHNIQUES TO IMPROVE WIRELESS COMMUNICATIONS FOR IN-SITU WELLBORE DEVICES

CROSS-REFERENCE TO RELATED APPLICATIONS

This application is a national stage entry of PCT/US2018/042951 filed Jul. 19, 2018, said application is expressly incorporated herein by reference in its entirety.

TECHNICAL FIELD

The present technology generally relates to signal transmission for in-situ wellbore monitoring and, more particularly, to techniques to improve wireless communications for downhole wellbore devices.

BACKGROUND

Overall production when recovering resources from a well may be affected by various downhole conditions such as water, pressure, temperature, fluid flow, formation and fluid properties, and so on. Downhole devices such as monitoring and/or control devices (e.g., flow control devices) are often employed and positioned downhole to measure these various conditions, regulate flow rates, maintain well integrity, and help improve overall productivity. These downhole devices typically from part of a larger completion system and communicate signals such as power and data signals with each other as well as with surface devices/equipment. Electrical cables are often employed to provide electrical power and facilitate data signal transfers between the downhole devices and surface equipment. However, some downhole devices may be positioned in difficult to reach well locations (e.g., outside a casing, in "wet" conditions, etc.). For these difficult to reach well locations, wireless technologies are used to communicate power and data signals. However, many of these wireless technologies rely on specific positions and relative alignments between downhole devices in order to properly function (e.g., inductive coupling). Natural movement in downhole well environments—e.g., due to earth formation changes, pressure changes, temperature changes, and the like—often affect the positions and relative alignments between downhole devices and present unique challenges to wireless communications.

BRIEF DESCRIPTION OF THE DRAWINGS

The embodiments herein may be better understood by referring to the following description in conjunction with the accompanying drawings in which like reference numerals indicate analogous, identical, or functionally similar elements. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

As used herein, the term "coupled" is defined as connected, whether directly or indirectly through intervening components, and is not necessarily limited to physical connections. The term "substantially" is defined to be essentially conforming to the particular dimension, shape or other word that substantially modifies, such that the component need not be exact. For example, substantially rectangular means that the object in question resembles a rectangle, but can have one or more deviations from a true rectangle. The "position" of an object can refer to a placement of the object, location of the object, plane of the object, direction of the object, distance of the object, azimuth of the object, axis of the object, inclination of the object, horizontal position of the object, vertical position of the object, and so forth. Moreover, the "position" of an object can refer to the absolute or exact position of the object, the measured or estimated position of the object, and/or the relative position of the object to another object.

As used here, the terms "up" and "down"; "upper" and "lower"; "upwardly" and downwardly"; and other like terms indicating relative positions above or below a given point or element are used in this description to more clearly described some embodiments of the invention. However, when applied to equipment and methods for use in wells that are deviated or horizontal, such terms may refer to a left to right, right to left, or other relationship as appropriate.

This disclosure provides inductive coupler configurations that improve wireless communications (e.g., power and/or data) between devices disposed in/around a wellbore. As mentioned, forming wired connections between downhole components may be difficult, impractical, and even unreliable—e.g., particularly if the downhole components are on different sides of a casing, production string, etc. Accordingly, embodiments of this disclosure provide inductive coupling configurations to provide electrical power and to communicate signals between downhole components. Such downhole devices may include monitoring devices, sensors, and the like, and can be disposed inside the wellbore, attached to production tubes, attached to a casing (or liner) that surrounds a wellbore, and the like. In addition, as discussed herein, the downhole devices can include, for example, pressure sensors, temperature sensors, stress/strain sensors, and other devices that measure seismic, environmental, mechanical, electrical, chemical, and other wellbore conditions. It is also appreciated that the disclosed inductive coupling configurations may be employed by any number of downhole devices.

Figure 1:
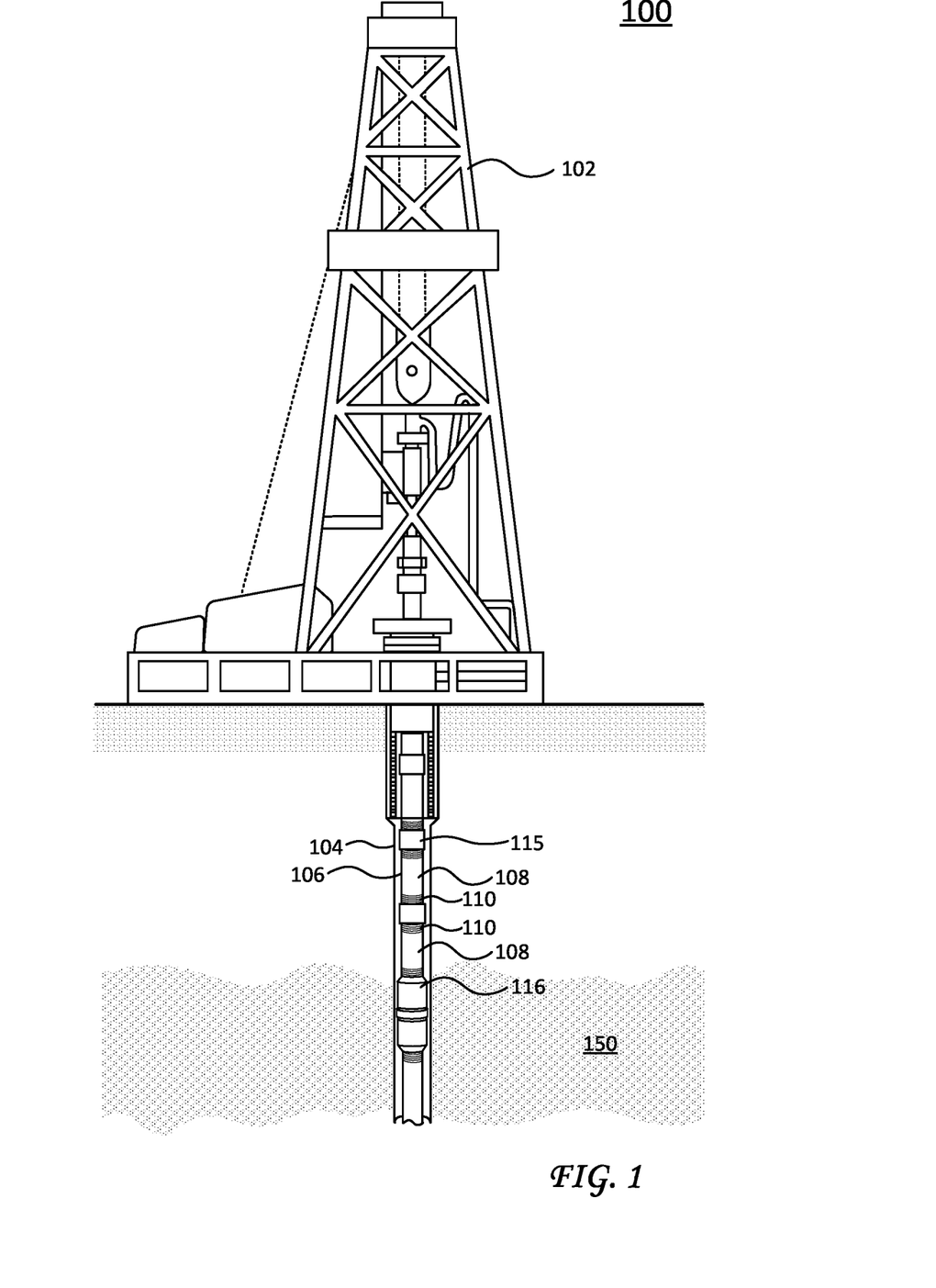
FIG. 1 illustrates a schematic diagram of a completion string, including various downhole devices or components, according to one embodiment of this disclosure.

Referring to the figures, FIG. 1 illustrates a schematic diagram of a well site 100, including a rig 102 disposed above a wellbore 104. As shown, wellbore 104 is a vertical bore, but it is appreciated wellbore 104 can also include other types of bores such as horizontal bores, deviated bores, multi-directional bores having combinations of vertical bores and horizontal bores, and the like.

Wellbore 104 is typically cased and cemented and generally defines a well path through subterranean formations 150. Although reference is made to a "casing", it is appreciated some embodiments may include other types of liners and/or tubing. As used herein, the term "casing" or "liner" may refer to segments or portions of a casing or liner. Casings and liners typically include an inner surface that defines an interior bore (which can house completion equipment such as a production string) and an outer surface (typically cemented or otherwise affixed to the wall of the wellbore). Devices attached to, or positioned outside of, the casing or liner section are mounted, either directly or indirectly, to the outer surface of the casing or liner section. Devices are also said to be attached to or positioned outside the casing or liner section if they are mounted or positioned in a cavity, chamber, or conduit defined in the housing of the casing or liner section.

A production string or production tube 106 is disposed within the casing and extends through wellbore 104 to subterranean formations 150, which may contain desired resources (e.g., hydrocarbons, etc.). Production string or tube 106 is formed from a plurality of production segments 108 interconnected by collars 115. As shown, collars 115 threadably interconnect production segments 108 by fastening portions 110, which include corresponding mating configurations. In operation, one or more flow control devices (not shown) may be attached to portions of production string 106 to control fluid flow, determine volumetric flow rates, measure internal pressures, and the like.

In addition, monitoring devices such as an inductive monitoring device 116, may be attached or coupled to portions of production string 106. As discussed herein, monitoring devices generally operate to measure various wellbore conditions, parameters, and/or characteristics to help improve reservoir performance.

Figure 2:
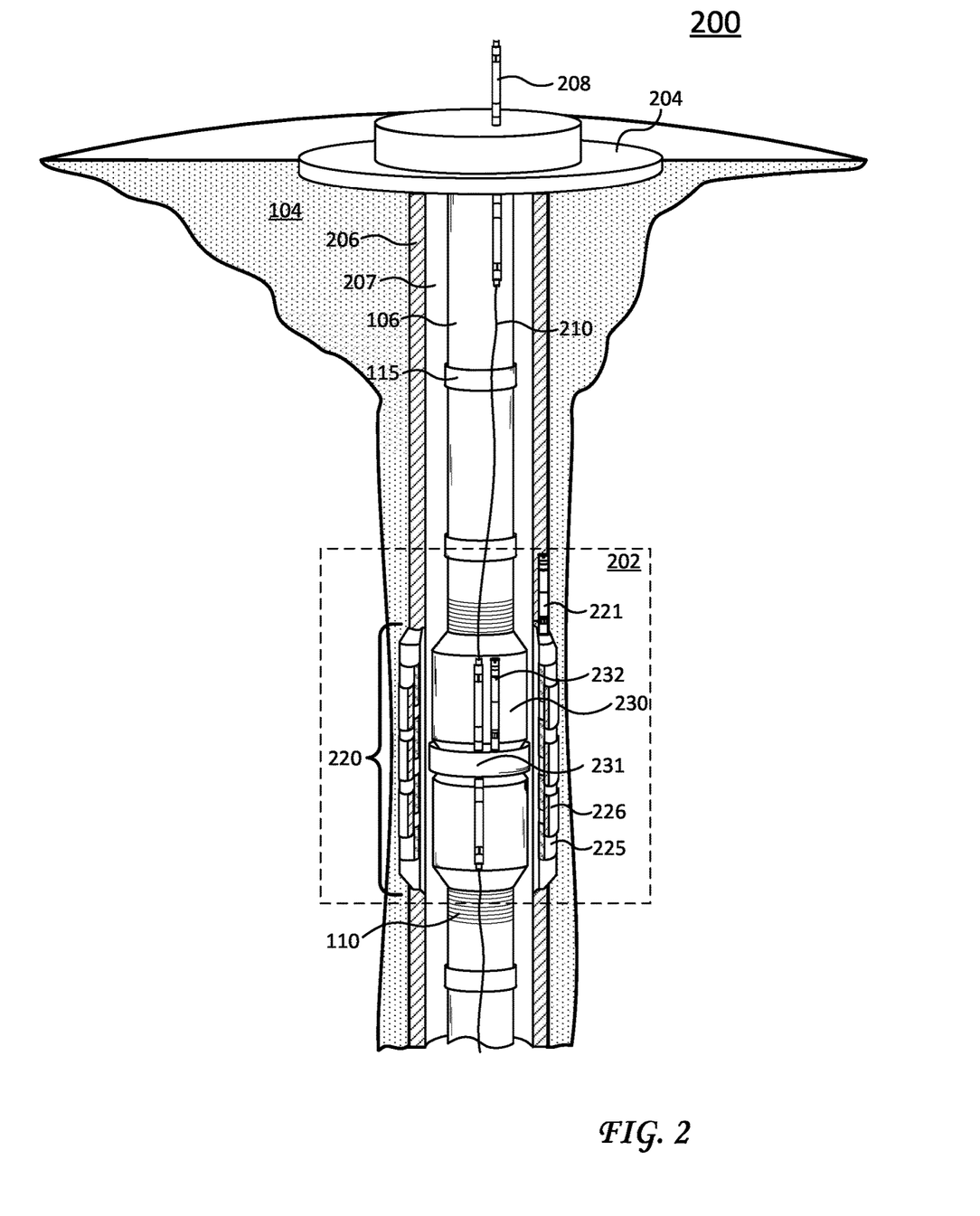
FIG. 2 illustrates a schematic diagram of a downhole environment showing a partial cross section view of an inductive monitoring system.

FIG. 2 illustrates a schematic diagram of a downhole environment 200 showing a partial cross section view of an inductive monitoring system 202. Here, wellbore 104 terminates in a wellhead structure 204. Wellhead structure 204 is shown for purposes of simplicity and discussion, and it is appreciated other equipment (e.g., rig 102, surface equipment, etc.) can be included (or excluded) as appropriate. A feedthrough 208 is attached to wellhead structure 204 and operates to relay power signals and/or data signals between surface equipment (not shown) and downhole equipment such as inductive monitoring system 202. In particular, feedthrough 208 communicates signals to inductive monitoring system 202 over a Tubing Electric Cable conduit (TEC) 210.

A casing (or liner) 206 is disposed in wellbore 104 and generally defines an interior bore 207 for housing production string 106. Components of inductive monitoring system 202 are coupled to portions of casing 206 as well as portions of production string 106. In particular, inductive monitoring system 202 includes a sensor assembly 220 attached to a portion of casing 206 and a control assembly 230 attached to a portion of production tube 106. For example, sensor assembly 220 and/or control assembly 230 may include respective attachment mechanisms to couple sensor assembly to the portion of casing 206 and couple control assembly to the portion of production tube 106. These attachment mechanisms can include a threaded configuration, with mating configurations on casing 206 and/or production tube 106. The attachment mechanisms may be used to adjust respective positions of sensor assembly 220 and/or controller assembly 230 to facilitate an inductive coupling (and thus, wireless signal communications) there-between. More specifically, respective inductive coils inductively couples control assembly 230 with sensor assembly 220—e.g., control assembly 230 includes an inductive coil 231 or a "driving coil" inductively coupled to two sets of inductive coils of sensor assembly 220. These two sets of inductive coils include an interior set of inductive coils 225 (e.g., a first set of inductive coils) and an exterior set of inductive coils 226 (e.g., a second set of inductive coils). Inductive coil 231 of control assembly 230 inductively couples with inductive coils 225 and/or inductive coils 226 of sensor assembly 220 to form a wireless communication channel for transmitting power signals, data signals, and the like. As is appreciated by those skilled in the art, inductive coupling refers to an electromagnetic relationship such that a change in current through one coil induces a voltage on another coil.

Still referring to FIG. 2, sensor assembly 220 includes a sensor module 221 and control assembly 230 includes a sensor module 232. These sensor modules operate to measure one or more conditions in wellbore 104. In this fashion, the sensor modules can represent any number of sensors, gauges, hardware and/or software operable to measure pressure, temperature, fluid flow, seismic activity, and the like.

In operation, control assembly 230 receives power signals and/or data signals (e.g., from surface equipment) over TEC 210. Depending on the nature of the signals, control assembly 230 may power its own sensor(s) (e.g., sensor module 232) and perform desired measurements and/or control assembly 230 may communicate power signals and/or data signals wirelessly to sensor assembly 220. More specifically, control assembly 230 communicates such signals over the communication channel formed between inductive coil 231 and inductive coils 225 and/or inductive coils 226. Sensor assembly 220 receives the power and/or data signals, performs desired measurements (e.g., using sensor module 221) and wirelessly transmits data signals (corresponding to its measurements) to control assembly 230 over the communication channel. Control assembly 230 may further process received data locally and/or it may forward the received data to surface equipment over TEC 210.

As mentioned above, positions and/or relative alignments between downhole components are often affected by environmental factors (e.g., formation changes, pressure changes, etc.). Wireless technologies facilitate communications between difficult to reach components, however, many wireless technologies are also affected by changes in relative positions/alignments. Accordingly, the dual and overlapping arrangement of inductive coils 225 and inductive coils 226 provides flexibility when aligning control assembly 230 relative to sensor assembly 220 by reducing transfer characteristics differences due to misalignment between control assembly 230 and sensor assembly 220 and also provides a consistent frequency signal for transmission frequency recovery purposes.

Figure 3:
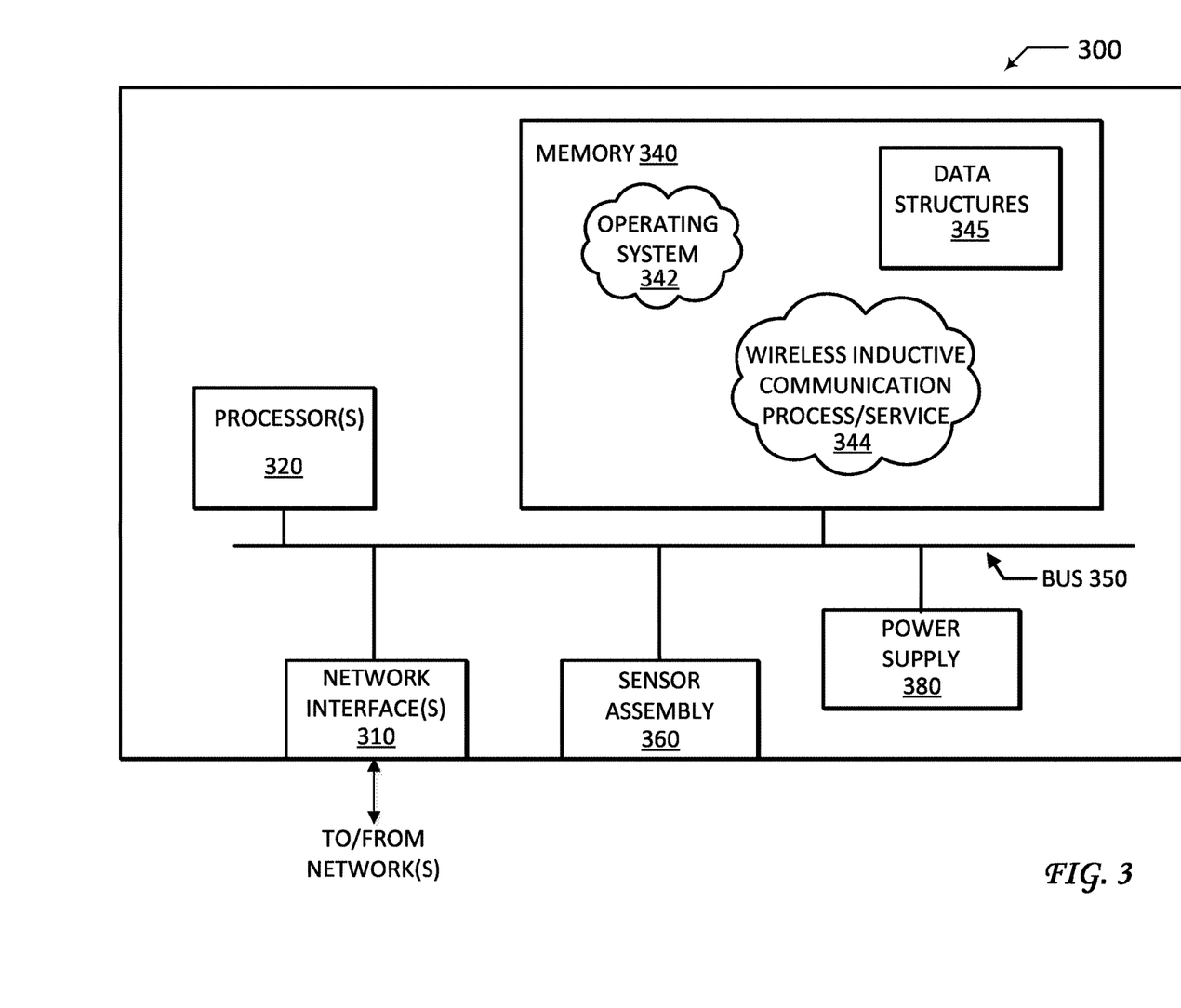
FIG. 3 illustrates a schematic diagram of an inductive device that can be employed as a component part of the inductive monitoring system shown in FIG. 2.

FIG. 3 is a schematic diagram of an inductive device 300, which can represent one or more components of inductive monitoring system 202 shown in FIG. 2. Device 300 is particularly configured to perform wireless inductive communication techniques discussed herein.

As shown, device 300 includes hardware and software components such as network interfaces 310, at least one processor 320, memory 340, sensors 360, and a power supply 380 interconnected by a system bus 350. Network interface(s) 310 include mechanical, electrical, and signaling circuitry for communicating data over a communication channel, which may include wired links (e.g., TEC 210) or wireless communication links (e.g., a communication channel established between sensor assembly 220 and control assembly 230). Network interfaces 310 are configured to transmit and/or receive data using a variety of different communication protocols, as will be understood by those skilled in the art. Also, while the network interfaces 310 are shown separately from power supply 380, for powerline communications (PLC) network interfaces 310 may communicate through power supply 380, or may be an integral component thereof. In some specific configurations the PLC signal may be coupled to the power line feeding into the power supply (e.g., TEC 210 and/or feedthrough components). Accordingly, power supply 380 may include a local battery (or it may be powered by electrical energy communicated over network interfaces 310).

Processor 320 represents a digital signal processor (e.g., a microprocessor, a microcontroller, or a fixed-logic processor, etc.) configured to execute instructions or logic to perform tasks in a wellbore environment. Processor 320 may include a general purpose processor, special-purpose processor (where software instructions are incorporated into the processor), a state machine, application specific integrated circuit (ASIC), a programmable gate array (PGA) including a field PGA, an individual component, a distributed group of processors, and the like. Processor 320 typically operates in conjunction with shared or dedicated hardware, including but not limited to, hardware capable of executing software and hardware. For example, processor 320 may include elements or logic adapted to execute software programs and manipulate data structures 345, which may reside in memory 340.

Sensors 360 typically operate in conjunction with processor 320 to perform wellbore measurements, and can include special-purpose processors, detectors, transmitters, receivers, and the like. For example, sensors 360 may include sensor modules 221/232.

Memory 340 comprises a plurality of storage locations that are addressable by processor 320 for storing software programs and data structures 345 associated with the embodiments described herein. An operating system 342, portions of which are typically resident in memory 340 and executed by processor 320, functionally organizes the device by, inter alia, invoking operations in support of software processes and/or services executing on device 300. These software processes and/or services may comprise an illustrative "wireless inductive communication" process/service 344, as described herein. Note that while wireless inductive communication process/service 344 is shown in centralized memory 340, some embodiments provide for these processes/services to be operated in a distributed network of devices (or components).

It will be apparent to those skilled in the art that other processor and memory types, including various computer-readable media, may be used to store and execute program instructions pertaining to the wireless communication techniques described herein. Also, while the description illustrates various processes, it is expressly contemplated that various processes may be embodied as modules configured to operate in accordance with the techniques herein (e.g., according to the functionality of a similar process). Further, while some processes or functions may be described separately, those skilled in the art will appreciate the processes and/or functions described herein may be performed as part of a single process. In addition, the disclosed processes and/or corresponding modules may be encoded in one or more tangible computer readable storage media for execution, such as with fixed logic or programmable logic (e.g., software/computer instructions executed by a processor, and any processor may be a programmable processor, programmable digital logic such as field programmable gate arrays or an ASIC that comprises fixed digital logic. In general, any process logic may be embodied in processor 320 or computer readable medium encoded with instructions for execution by processor 320 that, when executed by the processor, are operable to cause the processor to perform the functions described herein.

Figure 4:
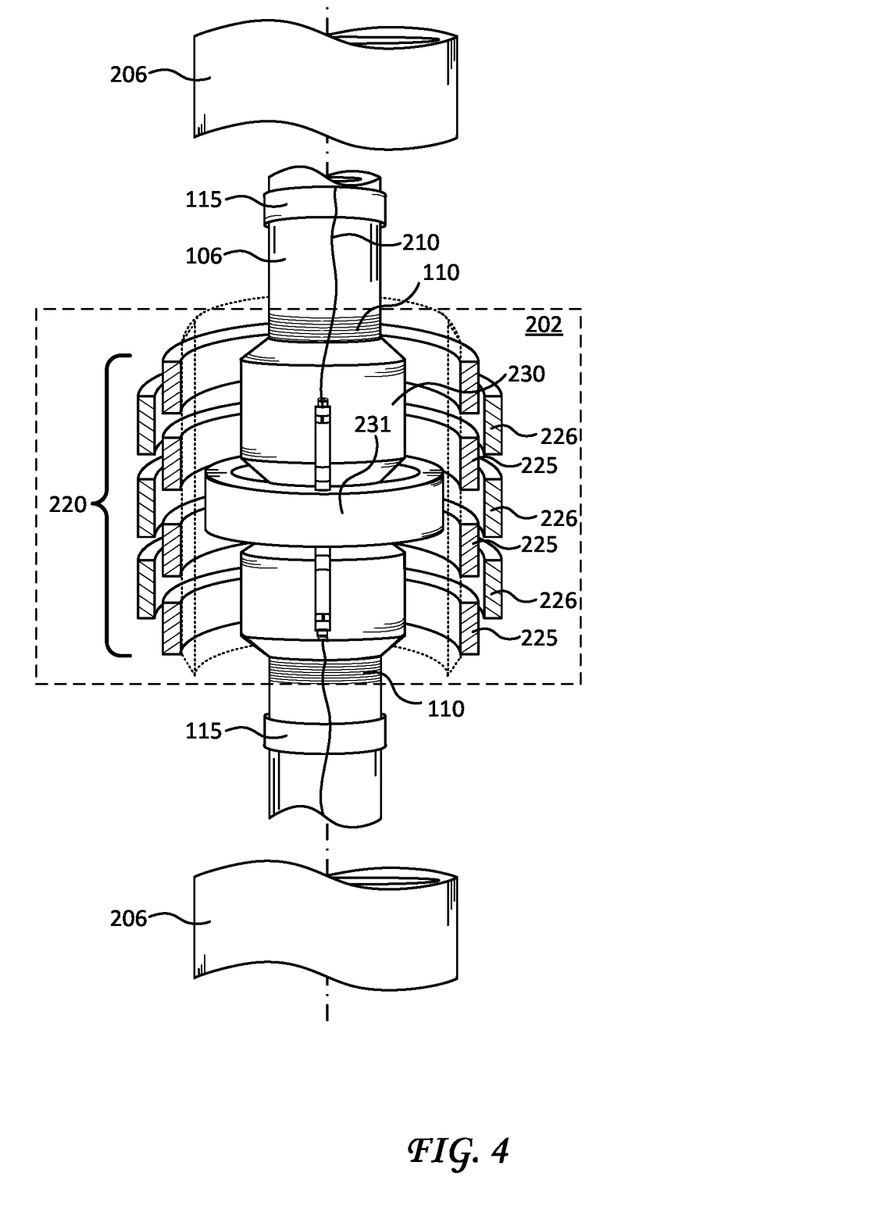
FIG. 4 illustrates an isolated partial cross section view of the inductive monitoring system shown in FIG. 2.

FIG. 4 illustrates an isolated partial cross section view of inductive monitoring system 202, particularly showing positions and alignments between the coils of control assembly 230 and the two sets of coils of sensor assembly 220.

As shown, inductive coils 225 (the interior/first set of inductive coils) and inductive coils 226 (e.g., the exterior/second set of inductive coils) of sensor assembly 220 substantially surround inductive coil 231 of control assembly 230 and form a wireless communication channel. In order to facilitate communications over the wireless communication channel, inductive coils 226 are arranged at an offset relative to inductive coils 225 where inductive coils 226 are staggered by a half coil pitch in relation to inductive coils 225. This offset or staggered configuration prevents voltage dips (e.g., signal loss) because inductive coils 226 cover or overlap any gaps/spaces between inductive coils 225. In this fashion, wireless signals from control assembly 230 (e.g., inductive coil 231) are received by inductive coils 225 and/or inductive coils 226 (or portions thereof) thereby accommodating potential changes in alignment between control assembly 230 and sensor assembly 220.

Figure 5A:
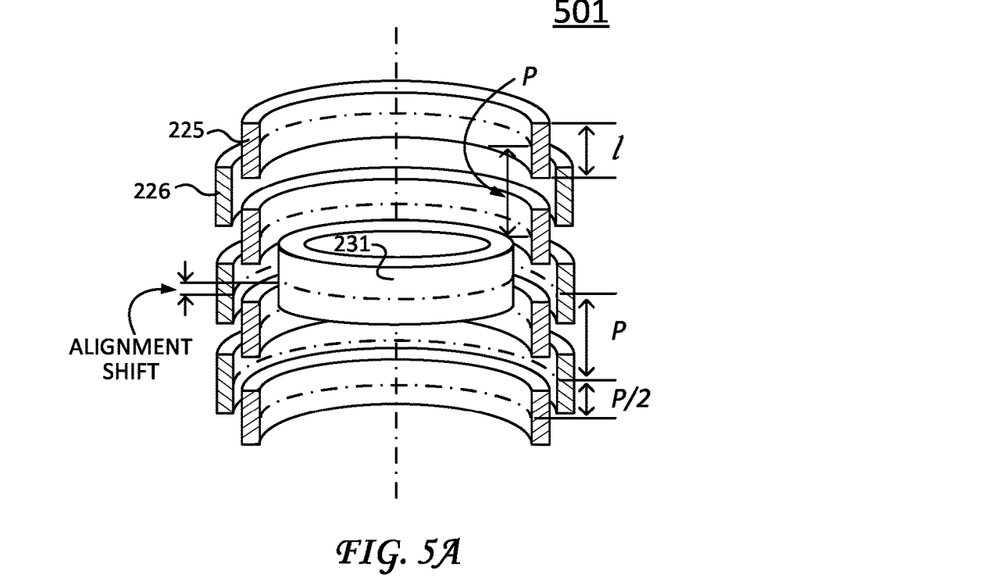
FIG. 5A illustrates an isolated partial cross section view of inductively coupled coils for the inductive monitoring system shown in FIG. 2.
Figure 5B:
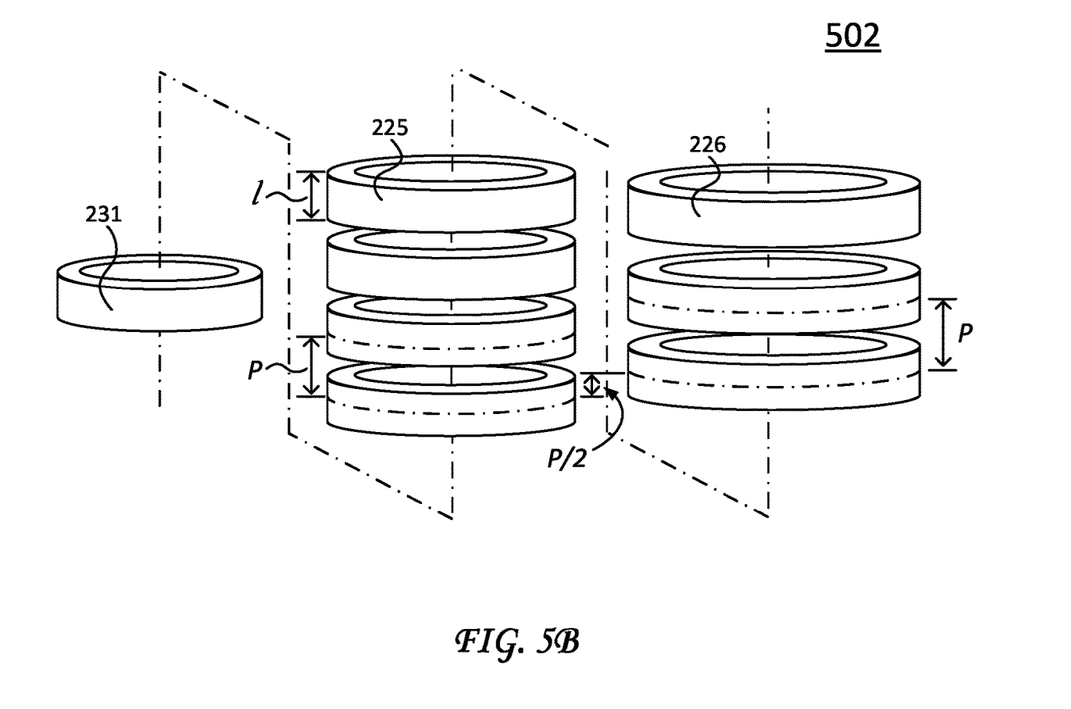
FIG. 5B illustrates an exploded perspective view of the inductively coupled coils shown in FIG. 5A.

FIG. 5A illustrates an isolated partial cross section view of 501 of inductive coils 231 corresponding to controller assembly 230 and the two sets of inductive coils corresponding to sensor assembly 220. FIG. 5B illustrates an exploded perspective view 502 of the inductively coupled coils shown in FIG. 5A. Collectively, FIGS. 5A and 5B show an offset or a staggered configuration between inductive coils 225 (e.g., the interior/first set of inductive coils) and inductive coils 226 (e.g., the exterior/second set of inductive coils). Notably, as discussed above, downhole components in a wellbore environment may move or shift over time, which can impact wireless communications there-between. In the particular context of sensor assembly 220 and control assembly 230, inductive coil 231 may move relative to inductive coils 225/226. This movement is indicated by an "alignment shift" in the axial direction shown in FIG. 5A. The two sets of overlapping inductive coils—here, inductive coils 225/226—prevents wireless signal when inductive coil 231 (the driving coil) is subject to movement in the wellbore environment. Moreover, the relative positions of coils for respective sets of coils (with respect to the driving coil and/or with respect to each other) also prevents such signal loss.

The relative positions are described by an alignment shift between inductive coil 231 and inductive coils 225 (e.g., resulting from installation and well conditions) and an offset or a staggered configuration between inductive coils 225 and inductive coils 226.

The alignment shift is measured between a center line of inductive coil 231 and a center line of the assembly of inductive coils 225. The offset or staggered configuration is a design parameter physically fixed during assembly and is measured between a center line of one of inductive coils 225 and a corresponding center line of one of inductive coils 226.

Still referring to FIG. 5A, the offset here is represented by a distance between respective center lines and is defined as a function of coil pitch "P" and a relationship to a coil length ("l") for inductive coils 225. Notably, in preferred embodiments, the coils of inductive coils 225/226 are uniform in length as well as uniform in spacing. Coil pitch P refers to a distance between center lines for coils of respective coils sets—e.g., inductive coils 225/226—and is defined in relation to coil length l, such that P≥l. That is, coil pitch P is the distance between the center lines as measured between co-planar (preferably uniform) coils in the same coil set.

As shown, inductive coils 226 are offset or staggered by "p/2" relative to inductive coils 225, which prevents potential signal loss that may occur at gaps or spaces between inductive coils 225. Notably, inductive coils 225 and inductive coils 226 are shown as having a same length "l", however it is appreciated that such relationship is not required. Importantly, the length and/or position of inductive coils 226 relative to inductive coils 225 should cover or overlap the gaps between coils of inductive coils 225 to prevent potential signal loss.

Figure 6:
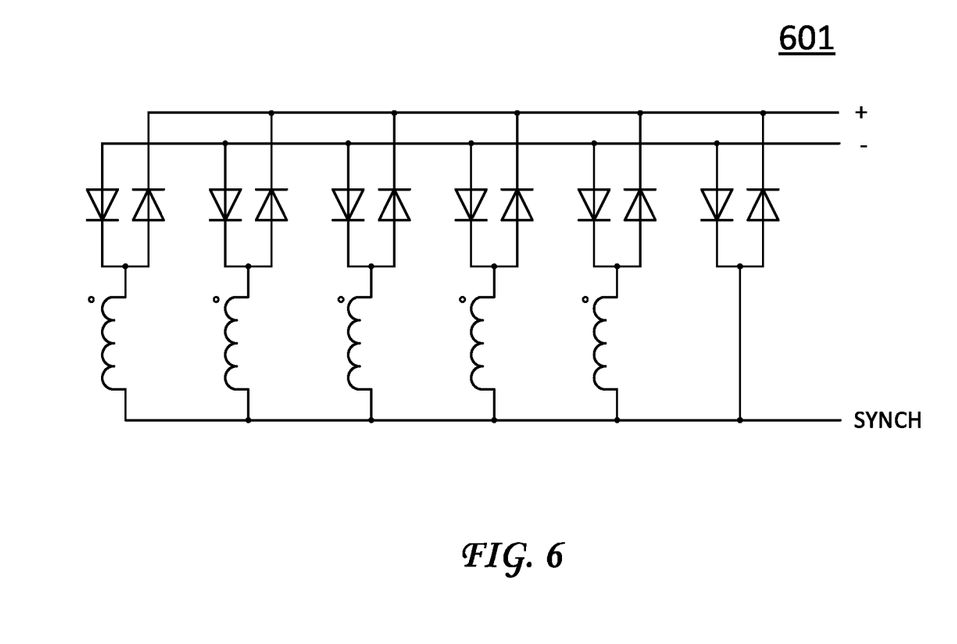
FIG. 6 illustrates an electrical schematic diagram for interconnecting coil elements of the inductive monitoring system shown in FIG. 2.

FIG. 6A illustrates an electrical schematic diagram 601 for interconnecting coil elements of sensor assembly 220 in a common direction. As shown, each coil for inductive coils 225 and inductive coils 226 is represented by an inductor symbol in schematic diagram 601 and a direction for the coils is indicated by polarity marks. The sensor assembly 220 is powered through terminals (+) and (−), and the Synch line provides a frequency signal.

The circuit shown in schematic diagram 601 operates similar to a bridge rectifier that rectifies an output of a multi-phase transformer. The bridge rectifier circuit acts as an automatic coil switch, where the coil 225/226 with the highest induced voltage will drive the output, where the remaining coils are passive. As the circuit is loaded, multiple coils may contribute as voltages drop due to current flow. Inductive coil 231 is driven by a transmitter circuit, producing a magnetic field and induces a voltage about inductive coils 225/226. In this fashion, inductive coil 231 becomes inductively coupled to coils of inductive coils 225/226. The "synch" signal will, due to its placement, effectively be a square wave signal at the same frequency as transmitter, varying from positive to negative (ground) rails. The synch signal is used to synchronize modulation circuitry so that e.g. load modulation can be applied to specific parts of the waveform. If the control assembly (230) communicates to the sensor module (221) circuitry by means of any frequency modulation (or related) scheme, this signal will be used by the sensor module receiver circuitry as well.

Figure 7:
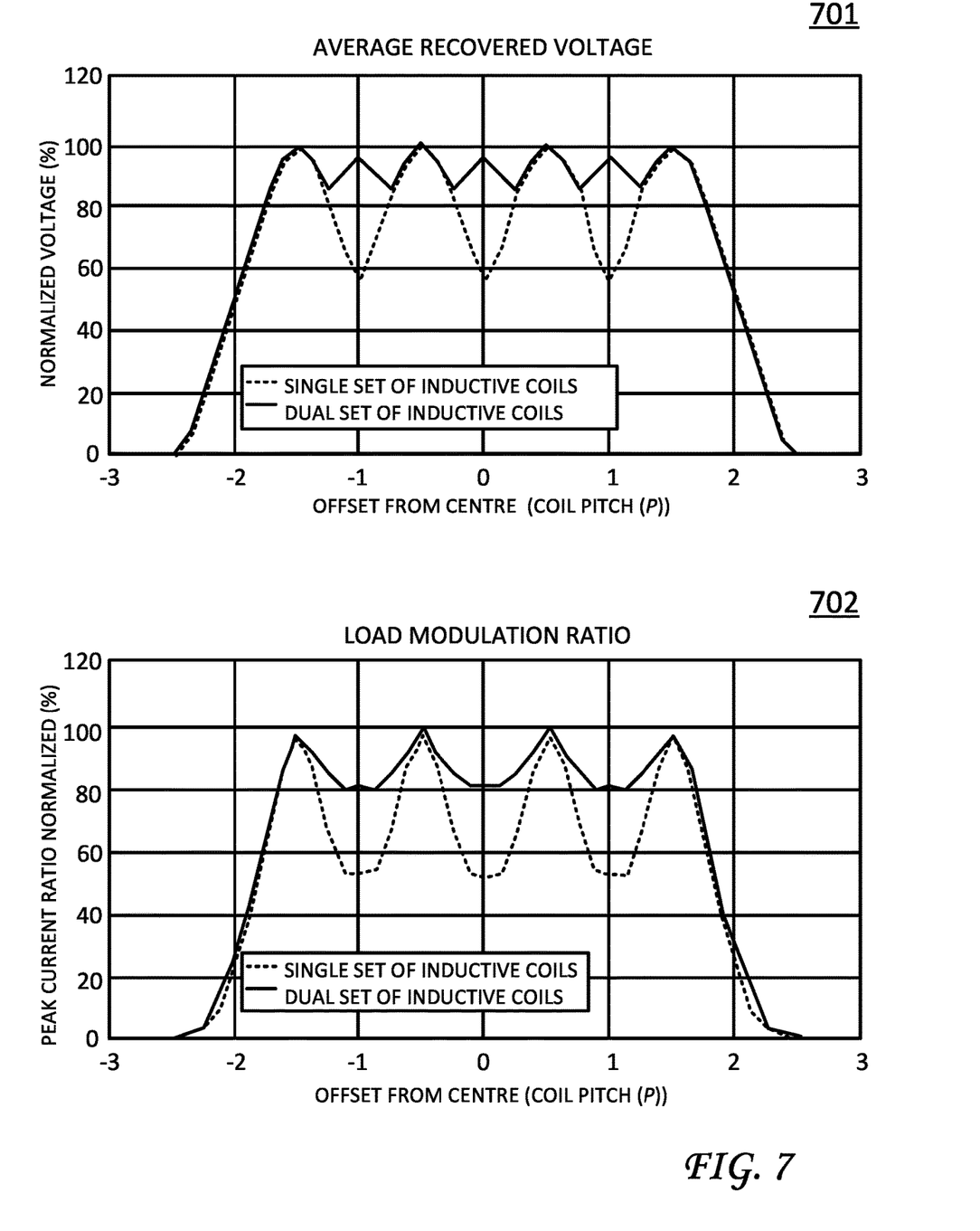
FIG. 7 illustrates graphs of voltage characteristics of the inductive monitoring system shown in FIG. 2.

FIG. 7 illustrates two graphs 701/702 that show voltage characteristics of the inductive monitoring system 202. In particular, graph 701 shows an output voltage of inductive coil 231 and graph 702 shows a modulation ratio/effectiveness of inductive coil 231 plotted against its relative motion as it moves in an axial direction with respect to inductive coils 225/226. In this fashion, graphs 701 and 702 plot voltage characteristics of inductive monitoring system 202, indicated by a solid line ("dual set of inductive coils"), as well as voltage characteristics of a sensor assembly that only includes a single set of inductive coils, indicated by a dash line ("single set of inductive coils") when translating the control module coil 231 through the length of the sensor assembly 220.

Here, graph 701 that shows an average recovered voltage normalized to the highest measured across the (+) and (−) terminals of 601 when driving a resistive load representative of a typical sensor system. Graph 702 shows the ratio of the peak current in the control assembly coil when the sensor module is replaced by a short circuit vs when driving the sensor module.

Figure 8:
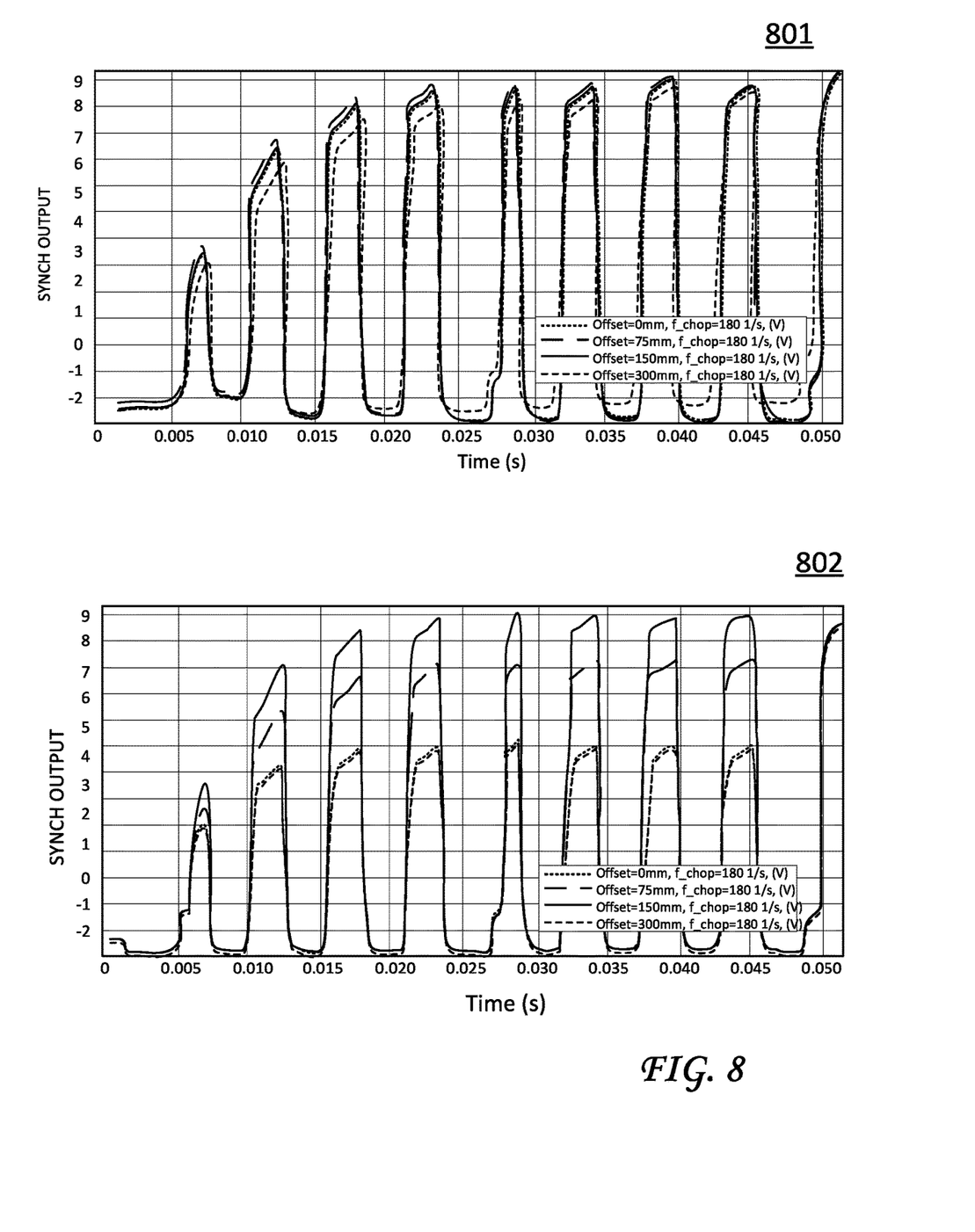
FIG. 8 illustrates graphs of sync signal characteristics for the inductive monitoring system shown in FIG. 2.

FIG. 8 illustrates graphs 801 and 802, showing sync output signal characteristics for inductive monitoring system 202, particularly from the perspective of inductive coils 225/226 for sensor assembly 220. Graph 801 particularly plots the sync output signal for inductive coils 225/226 when the inductive coils are interconnected in a common direction (e.g., ref. schematic diagram 601). Graph 802 plots received power for a control assembly configured with inductive coils 225 only. Notably, f_chop represents the control module driver frequency imposed on coil 231. Offset here represents "alignment shift" for a set of coils with P=300 mm.

Figure 9:
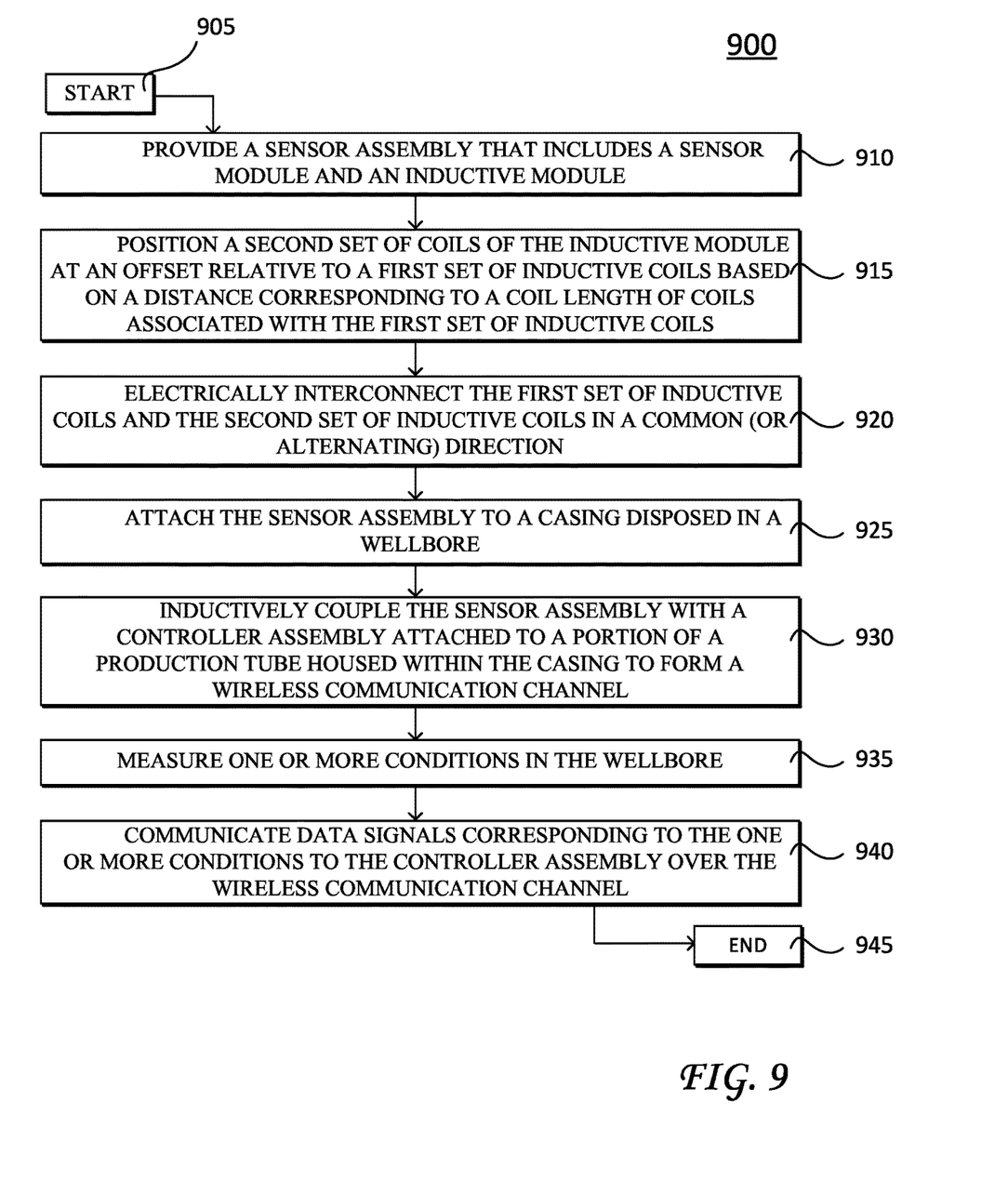
FIG. 9 illustrates a flow chart for a wireless inductive communication procedure in accordance with one or more embodiments of this disclosure.

FIG. 9 illustrates an exemplary wireless inductive communication procedure 900. Procedure 900 begins at step 905 and continues to step 910 where, as discussed above, a sensor assembly (e.g., sensor assembly 220) is provided. The sensor assembly particularly includes a sensor module (e.g., sensor module 221) and an inductive module having two sets of inductive coils (e.g., inductive coils 225/226). Next, at step 915, an exterior or second set or of inductive coils (e.g., inductive coils 226) are positioned at an offset relative to an interior or first set of inductive coils (e.g., inductive coils 225). In particular, as discussed above, the offset is based on a distance (e.g., P/2) between center lines of coils of the first set of inductive coils and coils of the second set of inductive coils as well as a relationship to a coil length l (e.g., P≥l).

Next, at step 920, the first set of inductive coils and the second set of inductive coils are electrically interconnected in a common direction. For example, the two sets of inductive coils may be interconnected according to the schematic diagram shown in FIG. 6. The sensor assembly is further attached, at step 925, to a casing disposed in a wellbore. Referring again to FIG. 2, the sensor assembly may be attached to an exterior portion of casing (or liner) 206.

Procedure 900 continues on to step 930 where the sensor assembly is inductively coupled with a controller assembly (e.g., controller assembly 230), which controller assembly is further attached to a portion of a production tube (e.g., production tube 106) housed within the casing (e.g., casing 206). This inductive coupling forms a wireless communication channel for exchanging data and power signals between the control assembly and the sensor assembly.

At step 935, the control assembly and/or the sensor assembly measure one or more conditions in the wellbore. For example, as discussed above, the control assembly and/or the sensor assembly can include any number of sensor modules, which operate to measure conditions corresponding to seismic activity, environmental activity, mechanical stresses/strains, volumetric fluid flows, chemical compositions, electrical resistivity, and so on. The sensor assembly communicates data signals corresponding to its measurements over the wireless communication channel (e.g., formed by the inductive coupling) in step 940. Notably, the control assembly may further communicate data signals corresponding to its measurements as well as those from sensor assembly to additional monitoring systems and/or to surface equipment (e.g., using TEC 210).

Procedure 900 may subsequently end at step 945, or it may continue on again to step 910 where the sensor assembly is provided. It is appreciated that certain steps within procedure 900 may be optional, and further, the steps shown in FIG. 9 are merely examples for illustration—certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments for monitoring systems that leverage improved wireless inductive communication channels, it is to be understood that various other adaptations and modifications may be made within the spirit and scope of the embodiments herein. For example, the embodiments have been shown and described herein with respect to in-situ wellbore devices and specific components. However, the embodiments in their broader sense are not as limited, and may, in fact, be used with any type of devices disposed in a wellbore. In addition, the embodiments are shown with certain devices/modules performing certain operations however, it is appreciated that various other sensors/devices may be readily modified to perform operations without departing from the spirit and scope of this disclosure.

The foregoing description has been directed to specific embodiments. It will be apparent, however, that other variations and modifications may be made to the described embodiments, with the attainment of some or all of their advantages. For instance, it is expressly contemplated that the procedures and communication processes described herein can be implemented as software being stored on a tangible (non-transitory) computer-readable medium, devices, and memories (e.g., disks/CDs/RAM/EEPROM/ etc.) having program instructions executing on a computer, hardware, firmware, or a combination thereof. Further, methods describing the various functions and techniques described herein can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on. In addition, devices implementing methods according to these disclosures can comprise hardware, firmware and/or software, and can take any of a variety of form factors. Functionality described herein also can be embodied in peripherals or add-in cards. Such functionality can also be implemented on a circuit board among different chips or different processes executing in a single device, by way of further example. Instructions, media for conveying such instructions, computing resources for executing them, and other structures for supporting such computing resources are means for providing the functions described in these disclosures. Accordingly this description is to be taken only by way of example and not to otherwise limit the scope of the embodiments herein. Therefore, it is the object of the appended claims to cover all such variations and modifications as come within the true spirit and scope of the embodiments herein.

STATEMENTS OF THE DISCLOSURE INCLUDE

Statement 1: A system for monitoring conditions in a wellbore, the system comprises a sensor assembly attached to a portion of a casing disposed in the wellbore. The sensor assembly includes a sensor module that measures one or more conditions in the wellbore and an inductive module. The inductive module forms a wireless communication channel and includes a first set of inductive coils and a second set of inductive coils that substantially surround the first set of inductive coils. The system further includes a controller assembly attached to a portion of a production tube housed within the casing. The controller assembly includes at least one coil inductively coupled to the inductive module and communicates signals over the wireless communication channel.

Statement 2: The system according to Statement 1, wherein coils associated with the second set of inductive coils are positioned at an offset relative to coils associated with the first set of inductive coils.

Statement 3: The system according to any one of Statements 1-2, wherein the offset is defined by a distance corresponding to a coil length of the coils associated with the first set of inductive coils.

Statement 4: The system according to any one of Statements 1-3, wherein the at least one coil of the controller assembly is inductively coupled to at least one of the first set of inductive coils or the second set of inductive coils.

Statement 5: The system according to any one of Statements 1-4, wherein the controller assembly communicates power signals and data signals over the wireless communication channel.

Statement 6: The system according to any one of Statements 1-5, wherein the controller assembly further comprises at least one network interface that communicates sensor data from the sensor assembly over the wireless communication channel.

Statement 7: The system according to any one of Statements 1-6, wherein the controller assembly includes a network interface, and wherein the system further includes a tubular electrical cable (TEC) that electrically couples the network interface of the controller assembly to surface equipment.

Statement 8: The system according to any one of Statements 1-7, wherein the sensor assembly further comprises an electrical bus that interconnects the first set of inductive coils and the second set of inductive coils in a common direction.

Statement 9: The system according to any one of Statements 1-8, wherein the sensor assembly further comprises an electrical bus that interconnects the first set of inductive coils and the second set of inductive coils in an alternating direction.

Statement 10: The system according to any one of Statements 1-9, wherein the controller assembly further comprises an attachment mechanism that includes one or more threads to adjust a position of the controller assembly on the portion of the production tube to align the at least one coil of the controller assembly with at least one of the first set of inductive coils or the second set of inductive coils of the sensor assembly.

Statement 11: A sensor device for monitoring conditions in a wellbore. The sensor device comprises an attachment mechanism that couples the sensor device to a portion of a casing disposed in the wellbore, and inductive module, and a sensor module. The inductive module includes a first set of coils and a second set of coils. The second set of coils are positioned at an offset relative to the first set of coils and substantially surround the first set of coils. At least one of the first set of coils or the second set of coils forms a wireless communication channel to communicate power signals and data signals with a controller device attached to a portion of a production tube housed within the casing. The sensor module receives power signals from the inductive module and measures one or more conditions in the wellbore.

Statement 12: The sensor device according to Statements 11, wherein the offset is defined by a distance corresponding to a coil length of coils associated with the first set of coils.

Statement 13: The sensor device according to any one of Statements 11-12, wherein the attachment mechanism further comprises a threaded configuration that mates with a portion of the casing disposed in the wellbore.

Statement 14: The sensor device according to any one of Statements 11-13, wherein the sensor device further includes an electrical bus that interconnects the first set of coils and the second set of coils in a common direction.

Statement 15: The sensor device according to any one of Statements 11-14, wherein the sensor device further includes an electrical bus that interconnects the first set of coils and the second set of coils in an alternating direction.

Statement 16: The sensor device according to any one of Statements 11-16, wherein the attachment mechanism attaches the device at a position on the portion of casing to inductively couple the inductive module to at least one coil of the controller device.

Statement 16: A method for monitoring conditions in a wellbore comprises attaching a sensor assembly to a casing disposed in the wellbore, and inductively coupling at least one of a first set of coils or a second set of coils of the sensor assembly with a controller assembly attached to a portion of a production tube housed within the casing to form a wireless communication channel. The second set of coils are positioned at an offset relative to the first set of coils and substantially surround the first set of coils. The method further comprises measuring, by a sensor of the sensor assembly, one or more conditions in the wellbore, and communicating data signals corresponding to the one or more conditions to the controller assembly over the wireless communication channel.

Statement 18: The method according to Statement 17, further comprising: positioning coils associated with the second set of coils at the offset relative to the first set of coils based on a distance corresponding to a coil length of coils associated with the first set of coils.

Statement 19: The method according to any one of Statements 17-18, further comprising: electrically interconnecting the first set of coils and the second set of coils in a common direction.

Statement 20: The method according to any one of Statements 17-19, wherein inductively coupling the at least one of the first coils or the second set of coils of the sensor assembly with the controller assembly, further comprises inductively coupling the at least one of the first coils or the second set of coils of the sensor assembly with a coil of the controller assembly.

What is claimed is:

1. A system for monitoring conditions in a wellbore, the system comprising:
    a sensor assembly attached to a portion of a casing disposed in the wellbore, the sensor assembly includes a sensor module that measures one or more conditions in the wellbore and an inductive module that forms a wireless communication channel, the inductive module including a first set of inductive coils and a second set of inductive coils that are offset from each other according to a coil pitch function and a coil length relationship such that a plurality of gaps associated with the first set of inductive coils are covered by respective inductive coils of the second set of inductive coils; and
    a controller assembly attached to a portion of a production tube housed within the casing, the controller assembly including at least one coil inductively coupled to the inductive module, wherein the controller assembly communicates signals via the wireless communication channel based on:
        the first set of inductive coils and the second set of inductive coils being offset from each other according to the coil pitch function and the coil length relationship, and
        the plurality of gaps associated with the first set of inductive coils being covered by the respective inductive coils of the second set of inductive coils.

2. The system of claim 1, wherein the at least one coil of the controller assembly is inductively coupled to at least one of the first set of inductive coils or the second set of inductive coils.

3. The system of claim 1, wherein the controller assembly communicates power signals and data signals over the wireless communication channel.

4. The system of claim 1, wherein the controller assembly further comprises at least one network interface that communicates sensor data from the sensor assembly over the wireless communication channel.

5. The system of claim 1, wherein the controller assembly includes a network interface, the system further comprising:
    a tubular electrical cable (TEC) that electrically couples the network interface of the controller assembly to surface equipment.

6. The system of claim 1, wherein the sensor assembly further comprises an electrical bus that interconnects the first set of inductive coils and the second set of inductive coils in a common direction.

7. The system of claim 1, wherein the sensor assembly further comprises an electrical bus that interconnects the first set of inductive coils and the second set of inductive coils in an alternating direction.

8. The system of claim 1, wherein the controller assembly further comprises an attachment mechanism that includes one or more threads to adjust a position of the controller assembly on the portion of the production tube to align the at least one coil of the controller assembly with at least one of the first set of inductive coils or the second set of inductive coils of the sensor assembly.

9. A sensor device for monitoring conditions in a wellbore, the sensor device comprising:
- an attachment mechanism that couples the sensor device to a portion of a casing;
- an inductive module that includes a first set of inductive coils and a second set of inductive coils, the second set of inductive coils are positioned at an offset from the first set of inductive coils according to a coil pitch function and a coil length relationship such that a plurality of gaps associated with the first set of inductive coils are covered by respective inductive coils of the second set of inductive coils, wherein:
  - at least one of the first set of inductive coils or the second set of inductive coils forms a wireless communication channel to communicate power signals and data signals with a controller device attachable to a portion of a production tube housed within the casing, and
  - the controller device includes at least one coil inductively coupled to the inductive module to communicate the power signals and the data signals based on:
    - the first set of inductive coils and the second set of inductive coils being offset from each other according to the coil pitch function and the coil length relationship, and
    - the plurality of gaps associated with the first set of inductive coils being covered by the respective inductive coils of the second set of inductive coils; and
- a sensor module that receives power signals from the inductive module and measures one or more conditions in the wellbore.

10. The sensor device of claim 9, wherein the attachment mechanism further comprises a threaded configuration that mates the portion of the casing.

11. The sensor device of claim 9, further comprising:
- an electrical bus that interconnects the first set of inductive coils and the second set of inductive coils in a common direction.

12. The sensor device of claim 9, further comprising:
- an electrical bus that interconnects the first set of inductive coils and the second set of inductive coils in an alternating direction.

13. The sensor device of claim 9, wherein the attachment mechanism attaches the device at a position on the portion of casing to inductively couple the inductive module to at least one coil of the controller device.

14. A method for monitoring conditions in a wellbore, the method comprising:
- attaching a sensor assembly to a casing, the sensor assembly including an inductive module that includes a first set of coils and a second set of coils that are offset from each other according to a coil pitch function and a coil length relationship such that a plurality of gaps associated with the first set of inductive coils are covered by respective inductive coils of the second set of inductive coils;
- inductively coupling at least one of the first set of coils or the second set of coils of the sensor assembly with a controller assembly attached to a portion of a production tube housed within the casing to form a wireless communication channel;
- measuring, by a sensor of the sensor assembly, one or more conditions in the wellbore; and
- communicating data signals corresponding to the one or more conditions to the controller assembly over the wireless communication channel, the controller assembly including at least one coil inductively coupled to the inductive module, wherein the controller assembly communicates the data signals via the wireless communication channel based on:
  - the first set of inductive coils and the second set of inductive coils being offset from each other according to the coil pitch function and the coil length relationship, and
  - the plurality of gaps associated with the first set of inductive coils being covered by the respective inductive coils of the second set of inductive coils.

15. The method of claim 14, further comprising:
- positioning the second set of coils relative to the first set of coils according to the coil pitch function and the coil length relationship such that the plurality of gaps associated with the first set of inductive coils are covered by respective inductive coils of the second set of inductive coils.

16. The method of claim 14, further comprising:
- electrically interconnecting the first set of coils and the second set of coils in a common direction.

17. The method of claim 14, wherein inductively coupling the at least one of the first coils or the second set of coils of the sensor assembly with the controller assembly, further comprises:
- inductively coupling the at least one of the first coils or the second set of coils of the sensor assembly with at least one coil of the controller assembly.

* * * * *